United States Patent [19]

Lutzker

[11] Patent Number: 4,843,716

[45] Date of Patent: Jul. 4, 1989

[54] CANAPE MAKER

[75] Inventor: Robert S. Lutzker, East Williston, N.Y.

[73] Assignee: L.K. Manufacturing Corp., West Babylon, N.Y.

[21] Appl. No.: 209,469

[22] Filed: Nov. 24, 1980

[51] Int. Cl.⁴ .............................................. B26B 27/00
[52] U.S. Cl. ......................................... 30/130; 30/316
[58] Field of Search ................. 30/130, 301, 316, 128; 17/32

[56] References Cited

U.S. PATENT DOCUMENTS

| D. 268,318 | 3/1983 | Lutzker | D7/43 |
| 1,539,678 | 5/1925 | Labombarde | 30/130 X |
| 1,857,383 | 5/1932 | Johnson | 30/316 |
| 2,052,510 | 8/1936 | Woolverton | 30/130 X |
| 2,271,908 | 2/1942 | Youngberg | 30/130 |
| 2,692,628 | 10/1954 | Elsaesser | 30/130 X |
| 2,821,019 | 1/1958 | Immink | 30/301 |
| 2,823,716 | 2/1958 | Van Gelder | 30/316 X |
| 3,697,036 | 10/1972 | Kanbar | 17/32 |
| 4,352,242 | 10/1982 | Plet | 30/115 X |

Primary Examiner—Frank T. Yost
Assistant Examiner—Michael D. Folkerts
Attorney, Agent, or Firm—Kane, Dalsimer, Sullivan, Kurucz, Levy, Eisele and Richard

[57] ABSTRACT

A food shaping cutter for making canapes, hors d'oeuvres and the like having an elongated hollow body with a tapered cutting edge and a piston within said body for ejecting cut food therefrom.

6 Claims, 6 Drawing Sheets

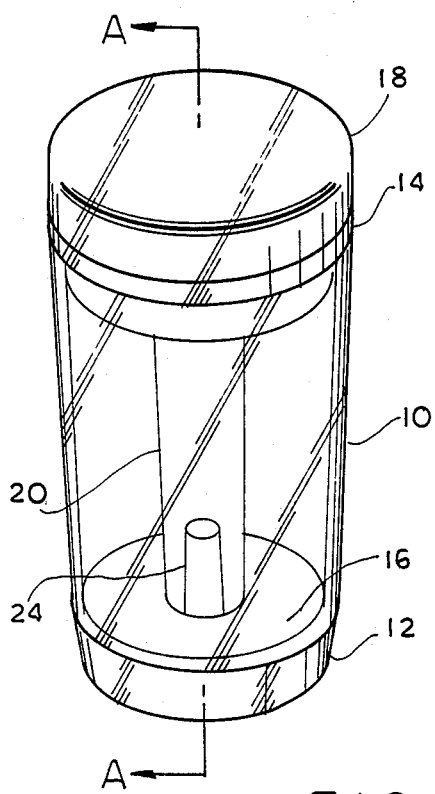
FIG. 1
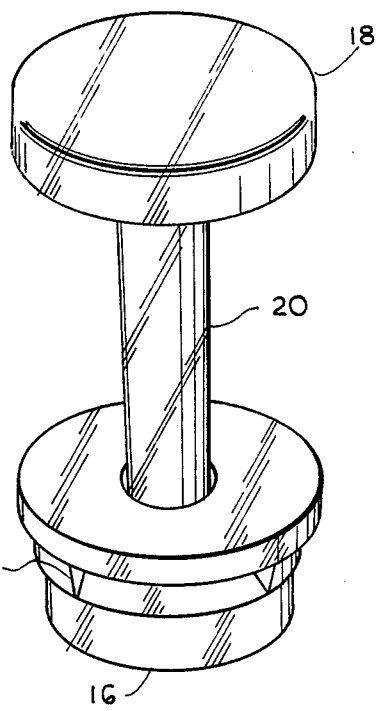
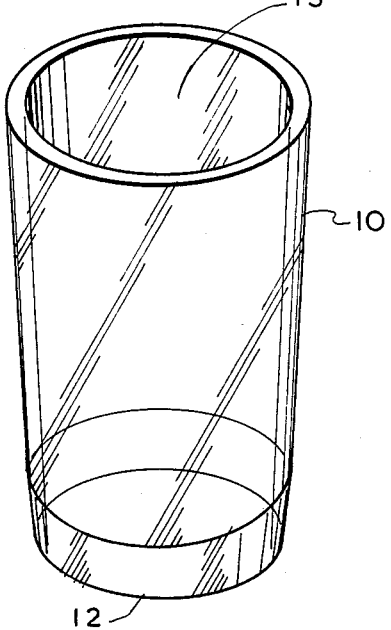
FIG. 3
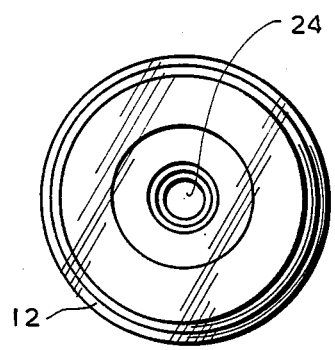
FIG. 2

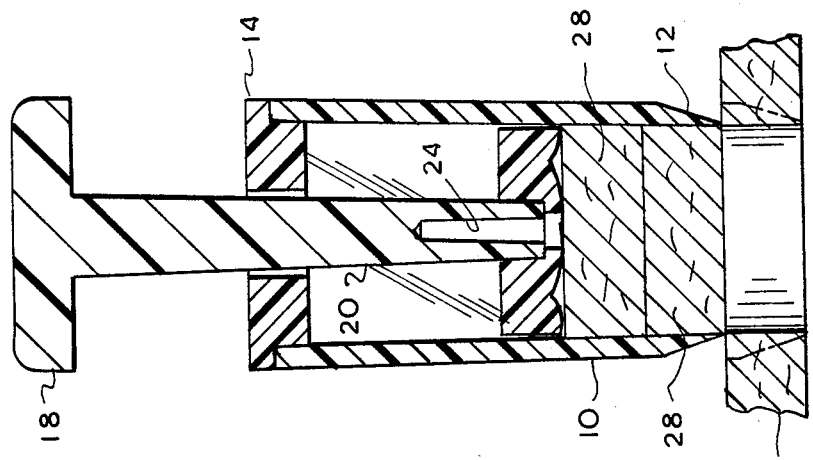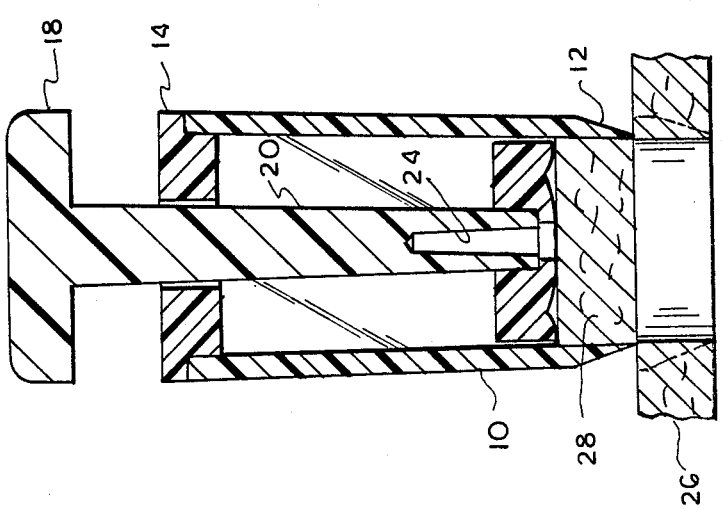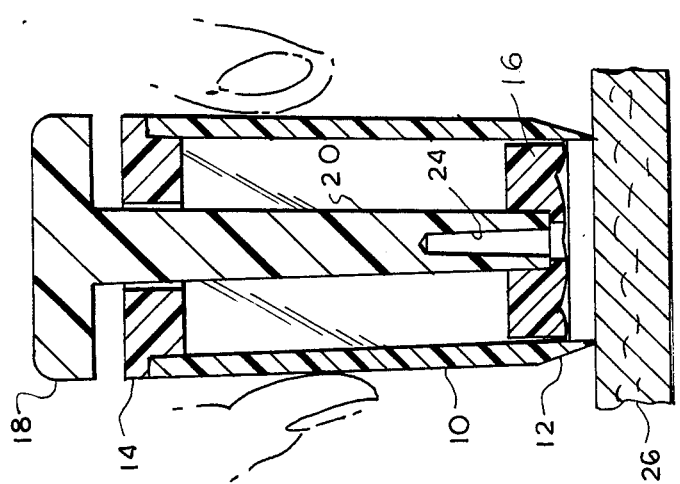

FIG. 10
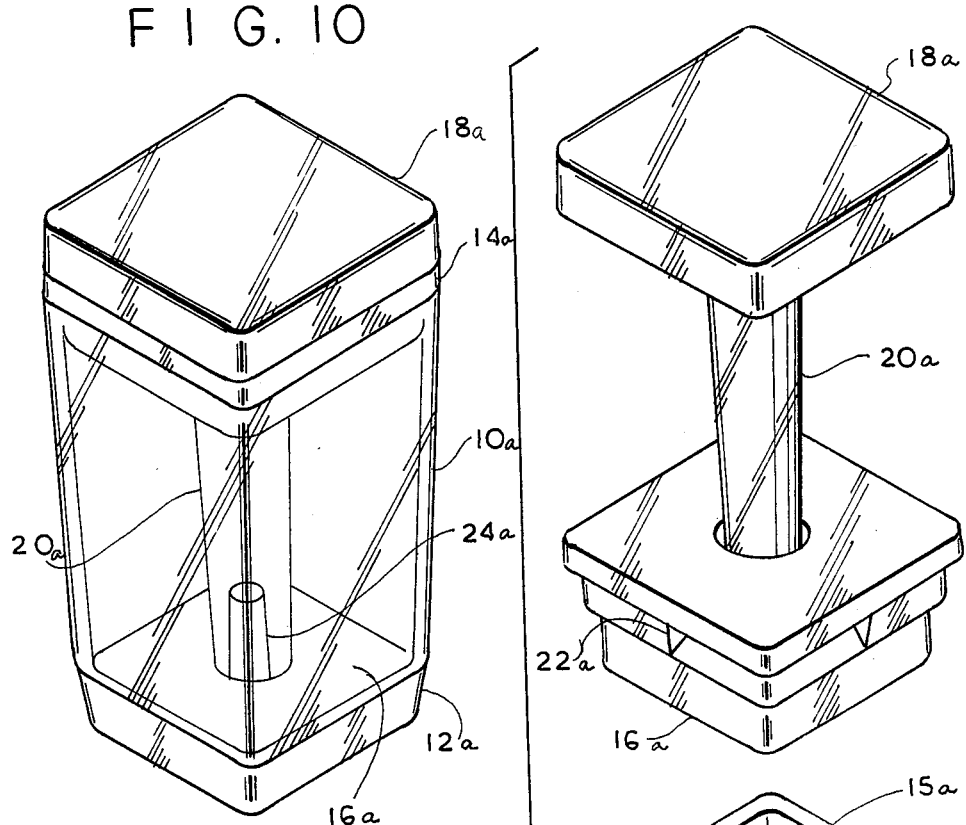
FIG. 12
FIG. 11
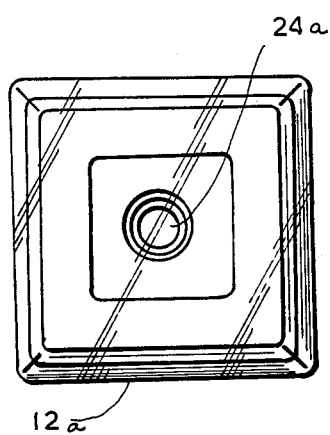 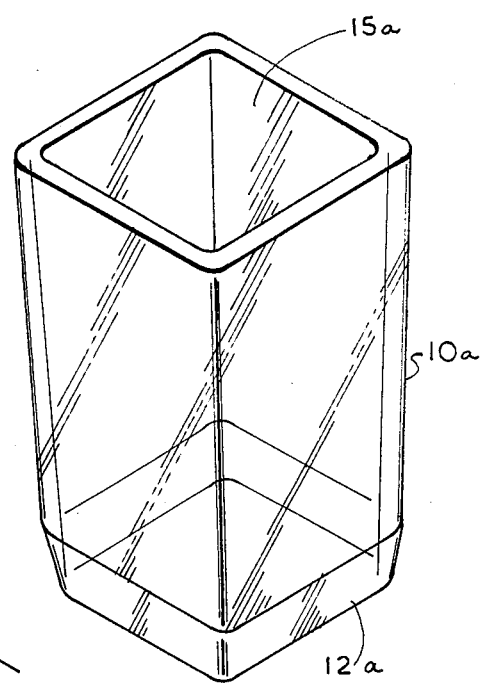

FIG. 13
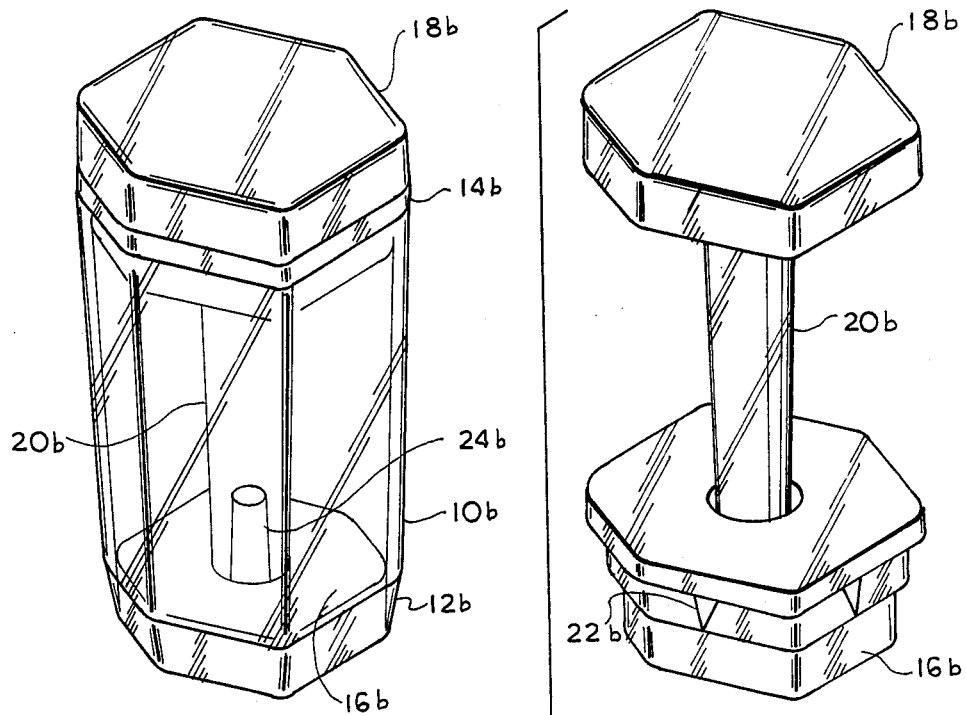
FIG. 15
FIG. 14
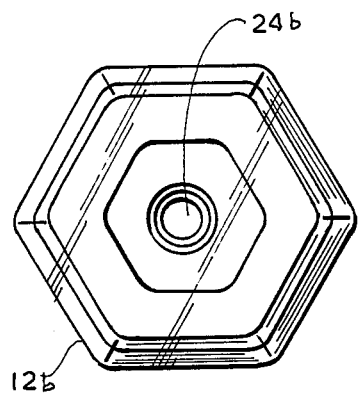
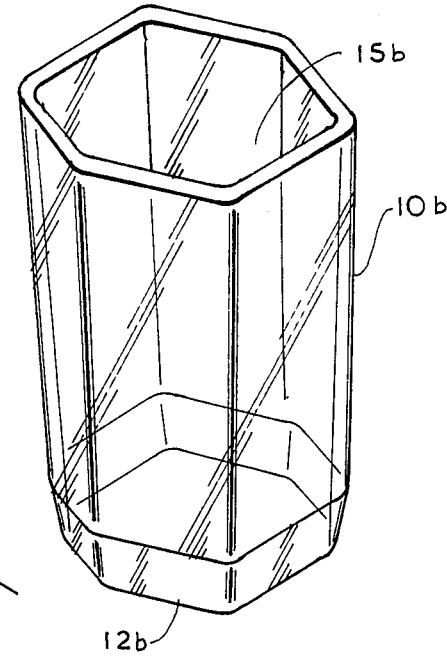

FIG. 16
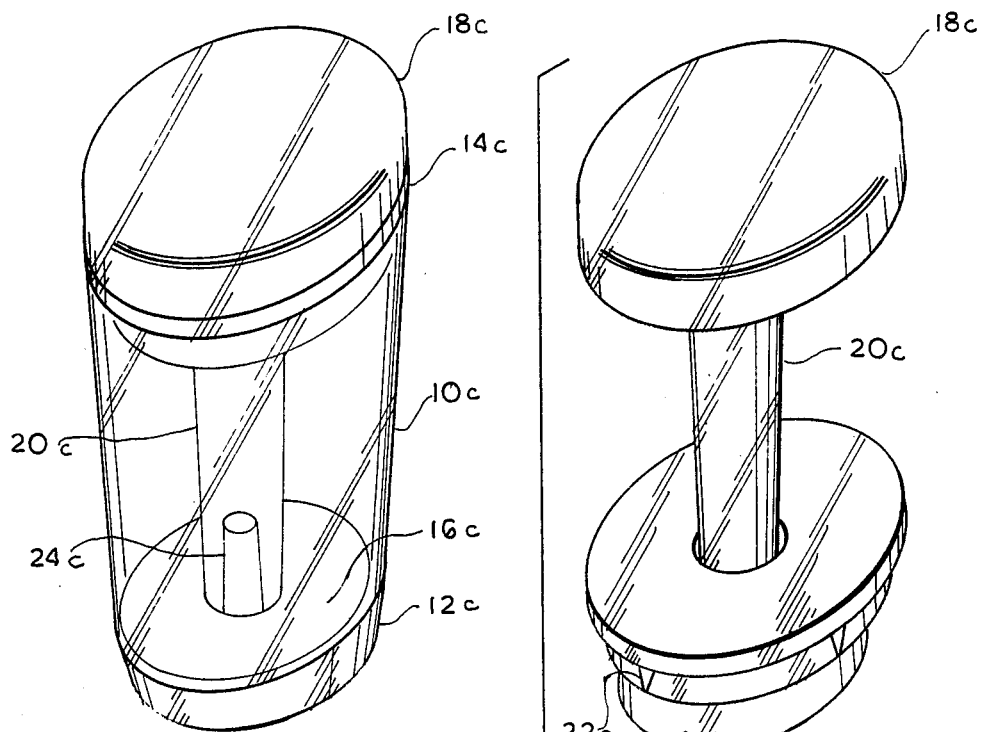
FIG. 18
FIG. 17
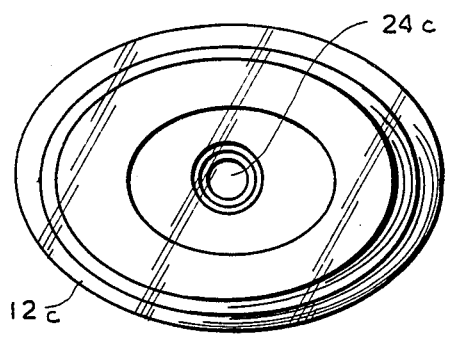
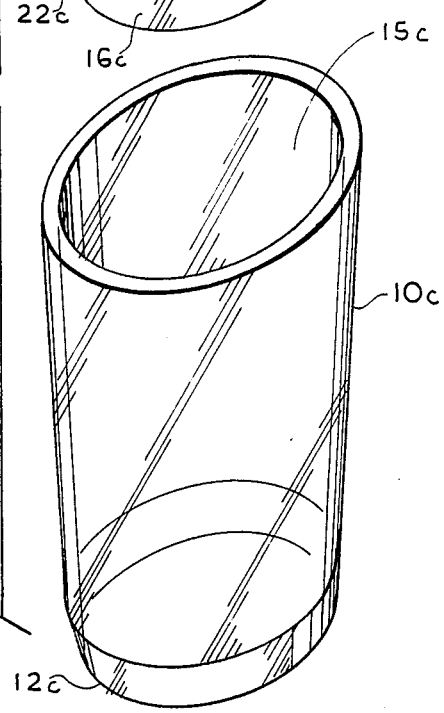

CANAPE MAKER

BACKGROUND OF THE INVENTION

This invention relates to a canape maker for cutting food into various ornamental shapes and threading the cut foot onto a toothpick or other skewer.

It is an object of the present invention to provide a simple inexpensive tool for preparing canapes, hors d'oeuvres and the like.

It is a further object of the present invention to provide a canape maker which is easily disassembled for cleaning and reassembled for use.

It is a further object to provide a canape maker having a cutting edge formed by tapering the outside surface into the inside surface of the hollow body to prevent cut food from jamming the cutter during use.

It is a further object of the present invention to provide a canape maker having a transparent body such that the user can see the canape as it is made.

It is a further object of the present invention to provide a canape of such design and constructed of such materials that it may be easily cleaned.

It is a further object of the present invention to provide a canape maker having a hollow body with a tapered bore. The narrower portion being at the cutter end, such that the cut piece of food collected in the hollow body will not emerge without the urging of a piston.

It is a further object of the present invention to provide a canape maker with a means for inserting a toothpick or the like through the entire canape, so that the end layers of food do not fall off the toothpick as removed from the hollow body or on serving.

With the above and other incidental objects in view which more fully appear in the specification, the invention intended to be protected by Letters Patent consists of the features of construction, the parts and combinations thereof, and the mode of operation as hereinafter described or illustrated in the accompanying drawings, or their equivalents.

IN THE DRAWINGS

FIG. 1 is an isometric top view of a canape maker in accordance with the present invention;

FIG. 2 is a top view of the canape maker shown in FIG. 1;

FIG. 3 is an isometric top view of the canape maker shown in FIG. 1 separated into two parts;

FIGS. 4, 5, 6, 7 and 8 are longitudinal sectional views of the canape maker shown in FIG. 1 taken substantially along the line A—A, which sequentially illustrate its operation;

FIGS. 10, 11 and 12 are views of an alternate embodiment of the subject invention wherein the hollow body is square; and Similarly FIGS. 13 through 18 are illustrations of embodiments having oval or hexagonal hollow bodies.

In all the accompanying drawings like elements bear the same reference numerals.

BRIEF DESCRIPTION OF THE PREFERRED EMBODIMENT

Figure 9:
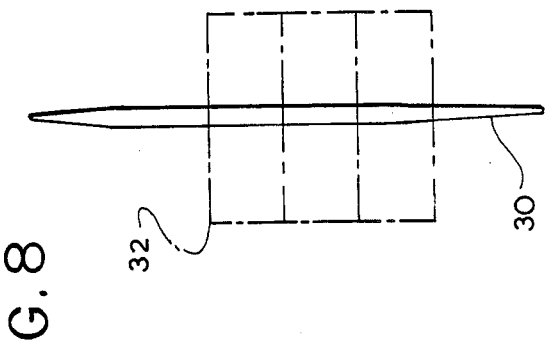
FIG. 9 is a side view of a finished canape.

Referring specifically to FIGS. 1 and 2, the hollow body 10 is cylindrical having a tapered cutting edge 12 at its lower end and an opening 15 at its upper end adapted to engagably receive cap 14. The cap 14 mates snugly with opening 15 and this fit may be improved by providing the mating portions of cap 14 or opening 15 with one or more small protrusions along their surfaces. Handle 18 is connected to piston 16 by stem 20 so that movement of one causes concomitant movement of the other. Cap 14 is provided with an opening through which stem 20 and air can move freely. The lower portion of piston 16 may be provided with a central cavity 24, which may extend as far as desired into stem 20 for receiving a toothpick or skewer as hereinafter described. The hollow body 10 has a bore slightly larger than the piston 16 facilitating its free movement and the bore may be slightly tapered along all or a portion of its length so that opening 15 is slightly larger than the opening at the cutter end 12. This prevents food plugs 28 from falling out of the hollow body without the urging of piston 16.

FIGS. 4 through 9 illustrate a mode of operation of the present invention. The first step FIG. 4 shows the cutting edge 12 placed in contact with food to be cut 26 with the piston 16 in the lower portion of the bore of hollow body 10. The cutting edge 12 is forced through food 26 and retracted as shown in FIG. 5. A shaped food plug 28 is thus formed and retained within hollow body 10. This step may be repeated until the bore of hollow body 10 is filled with plugs 28 collected as shown in FIG. 6.

Figure 8:
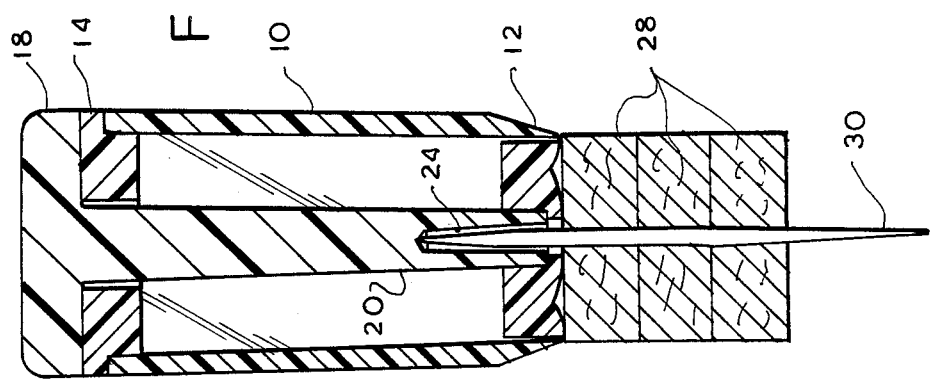
Figure 7:
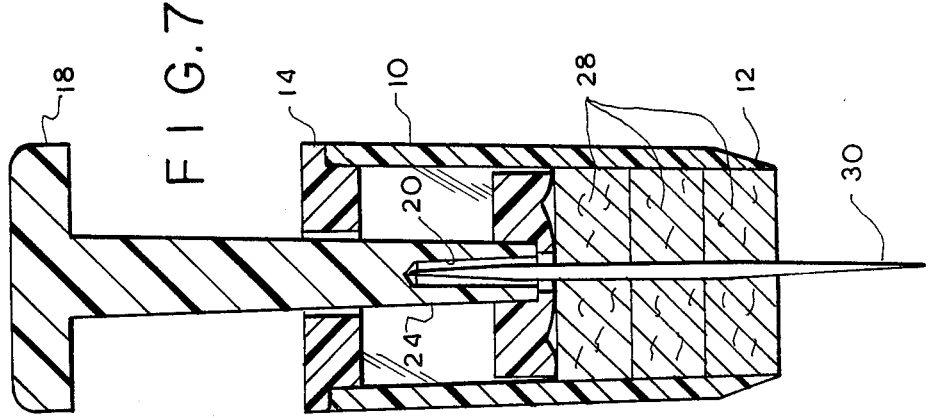

A toothpick 30 or other skewer may be inserted through plugs 28 into central cavity 24 and then handle 18 is pushed toward hollow body 10 whereby piston 16 urges plugs 28 and toothpick 30 out of the hollow body 10 as shown in FIGS. 7 and 8. This process produces a canape, hor d'oeuvre or the like 32 of the type shown in FIG. 9.

FIGs. 10–12, 13–15 and 16–18 illustrate alternate embodiments of the present invention, wherein the hollow body 10 and its related parts are square, hexagonal and oval, respectively.

While in order to comply with the statute this invention has been described in language more or less specific as to structural features, it is understood that the invention is not limited to the specific features shown and that the descriptions herein are but a few forms of many contemplated by this disclosure, and the invention is therefore claimed in any of its forms or modifications within the legitimate and valid scope of the appended claims.

I claim:

1. A canape maker comprising the combination:
   a hollow tubular body having an open forward end and a closed rear end and a bore therein, a tapered cutting edge on the exterior of the body at the forward end by tapering the exterior surface of the body forwardly into the inside surface of the body to prevent cut food from jamming the canape maker during use;
   a piston slidably mounted within the bore, the piston having a finger actuated stem extending through the closed end, a handle attached to the stem for moving the piston longitudinally within the hollow body, and the piston having a central aperture extending therein;
   whereby the forward end of the tubular body is adapted to cut layers for purposes of making a canape during which cutting operation the piston is moved rearwardly within the bore, whereupon when the desired number of layers constituting the canape are within the bore, a toothpick or the like is adapted to be inserted through these layers in the bore into the aperture in the piston to assure retention of all of the layers of the canape as a unit when the canape together with the toothpick is removed from the bore by pushing the piston forwardly towards the open end;

the rear closed end of the tubular body including means for facilitating the disassembly of the piston from the tubular body for cleaning purposes, the disassembly means including a cap having a bore therethrough for extending across the rear end of the tubular body to form the closed end, the stem of the piston extending through the cap bore and being slidable therein with the piston, stem and handle being attached to the cap in a manner to prevent disassembly therefrom; and the interior of the tubular body defining the bore being tapered uniformly with increased diameter from the forward end to the rear end to permit slight radial expansion of the layers after cutting and after being moved rearwardly within the bore and the cut layers of the canape collected in the body will not emerge without urging of the piston.

2. The invention in accordance with claim 1, wherein the cap includes means for increasing the securement of the cap to the rear end of the hollow body, the securement means including a plurality of ribs extending outwardly from the cap, with the cap having a reduced boss disposed internally of the rear end of the hollow body and the ribs being disposed on the reduced boss for increasing the frictional engagement of the boss with the rear end of the hollow body.

3. The invention in accordance with claim 1, wherein the central aperture extends into the stem.

4. The invention in accordance with claim 1, wherein the tubular body is square in cross-section.

5. The invention in accordance with claim 1, wherein the tubular body is oval in cross-section.

6. The invention in accordance with claim 1, wherein the tubular body includes more than four sides to provide canapes having a corresponding peripheral shape.

* * * * *